United States Patent
Ogue et al.

(10) Patent No.: US 11,177,056 B2
(45) Date of Patent: Nov. 16, 2021

(54) WATERPROOFING STRUCTURE AND WATERPROOFING METHOD FOR SHIELDED CABLE

(71) Applicant: Yazaki Corporation, Tokyo (JP)

(72) Inventors: Takeshi Ogue, Shizuoka (JP); Hideomi Adachi, Shizuoka (JP); Masahide Tsuru, Shizuoka (JP); Hiroyuki Yoshida, Shizuoka (JP); Kenta Yanazawa, Shizuoka (JP); Toshihiro Nagashima, Shizuoka (JP); Tetsuo Yamada, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 54 days.

(21) Appl. No.: 16/159,939

(22) Filed: Oct. 15, 2018

(65) Prior Publication Data
US 2019/0115120 A1    Apr. 18, 2019

(30) Foreign Application Priority Data

Oct. 16, 2017  (JP) .............................. JP2017-200159

(51) Int. Cl.
| | |
|---|---|
| *H01B 7/282* | (2006.01) |
| *H01B 9/02* | (2006.01) |
| *B60R 16/02* | (2006.01) |
| *H01B 13/00* | (2006.01) |
| *H01B 7/02* | (2006.01) |

(52) U.S. Cl.
CPC ....... *H01B 7/2825* (2013.01); *B60R 16/0215* (2013.01); *H01B 7/02* (2013.01); *H01B 9/024* (2013.01); *H01B 13/0036* (2013.01)

(58) Field of Classification Search
CPC ........ H01B 7/2825; H01B 7/285; H01B 7/02; H01B 9/024; H01B 13/0036
See application file for complete search history.

(56) References Cited

U.S. PATENT DOCUMENTS 5,378,995 A * 1/1995 Kudo .................... G01M 3/165
174/11 R
5,796,042 A * 8/1998 Pope ...................... H01B 7/288
174/102 SP (Continued)

FOREIGN PATENT DOCUMENTS

| CN | 101038800 A | 9/2007 |
| CN | 104575840 A | 4/2015 |

(Continued)

*Primary Examiner* — Timothy J Thompson
*Assistant Examiner* — Rhadames Alonzo Miller
(74) *Attorney, Agent, or Firm* — Sughrue Mion, PLLC

(57) ABSTRACT

A waterproofing structure for shielded cable includes: a shielded cable including one or more cables and a braided wire serving as a shielding member and covering the cables; and a grommet serving as a waterproofing member covering a waterproofed portion of the braided wire. Thermoplastic resins serving as waterproofing fillers are respectively disposed on an inner side and an outer side of the waterproofed portion of the braided wire. The gaps between the plurality of strands of the braided wire and the gap between the braided wire and the small-diameter cylindrical portion of the grommet are filled with the thermoplastic resin melted by heating.

8 Claims, 13 Drawing Sheets

(56) References Cited

U.S. PATENT DOCUMENTS

| | | | | |
|---|---|---|---|---|
| 5,949,018 | A * | 9/1999 | Esker | H01B 7/288 |
| | | | | 174/106 R |
| 6,293,080 | B1 * | 9/2001 | Nishihara | D02G 3/404 |
| | | | | 57/200 |
| 7,001,423 | B2 * | 2/2006 | Euteneuer | A61F 2/95 |
| | | | | 606/198 |
| 7,612,287 | B2 | 11/2009 | Ichikawa et al. | |
| 9,865,376 | B2 | 1/2018 | Hagi | |
| 9,875,824 | B2 | 1/2018 | Oga et al. | |
| 2001/0032734 | A1 * | 10/2001 | Madry | H01B 7/288 |
| | | | | 174/121 R |
| 2007/0215374 | A1 * | 9/2007 | Ichikawa | H01R 4/72 |
| | | | | 174/75 C |
| 2009/0194315 | A1 * | 8/2009 | Van Der Meer | H01B 7/2855 |
| | | | | 174/116 |
| 2010/0210745 | A1 * | 8/2010 | McDaniel | C09D 5/008 |
| | | | | 521/55 |
| 2012/0000690 | A1 * | 1/2012 | Van Der Meer | H01B 7/2825 |
| | | | | 174/102 R |
| 2014/0305678 | A1 * | 10/2014 | Fukuda | H01B 7/2825 |
| | | | | 174/11 OR |
| 2016/0148722 | A1 * | 5/2016 | Hagi | H02G 3/0468 |
| | | | | 174/128.1 |
| 2016/0189828 | A1 * | 6/2016 | Oga | B60R 16/0215 |
| | | | | 174/72 A |

FOREIGN PATENT DOCUMENTS

| | | |
|---|---|---|
| CN | 105431912 A | 3/2016 |
| JP | 2003-348737 A | 12/2003 |
| JP | 2015-32464 A | 2/2015 |
| JP | 2016-119821 A | 6/2016 |
| JP | 2017-220972 A | 12/2017 |

* cited by examiner

WATERPROOFING STRUCTURE AND WATERPROOFING METHOD FOR SHIELDED CABLE

CROSS REFERENCE TO RELATED APPLICATION

The present application is based on, and claims priority from Japanese Patent Application No. 2017-200159, filed Oct. 16, 2017, the disclosure of which is hereby incorporated by reference herein in its entirety.

TECHNICAL FIELD

The present application relates to a waterproofing structure and a waterproofing method for shielded cable to be used for power feeding, wiring, and the like of various vehicles such as a hybrid electric vehicle (HEV) and an electric vehicle (EV).

BACKGROUND

This type of a conventional example of a waterproofing structure for a shielded cable is disclosed in U.S. Pat. No. 9,875,824 B2. As illustrated in FIGS. 19 and 20, in a conventional waterproofing structure 2 of a shielded cable 1, only waterproofed portions of the shielded cable 1 (portions facing an elliptic cylindrical small-diameter cylindrical portion 7a of a grommet 7) are partially water-stopped. The shielded cable 1 includes two coated cables 3, a braided wire 4 as a shielding member counteracting electromagnetic waves covering the two coated cables 3, and a rubber waterproofing plug 5 that covers the waterproofed portions of the two coated cables 3.

The waterproofing structure 2 of the shielded cable 1 has a configuration in which braided meshes 4a of the braided wire 4 for covering the rubber waterproofing plug 5 is filled with an adhesive 6 and this portion is brought into close contact with a rubber grommet 7 by the elastic force of the elliptic cylindrical small-diameter cylindrical portion 7a, thereby preventing infiltration of water from the outside of the vehicle compartment on the side of the elliptic cylindrical small-diameter cylindrical portion 7a of the grommet 7 to the inside of the vehicle compartment on the side of the cylindrical large-diameter cylindrical portion 7b of the grommet 7.

SUMMARY

In the conventional waterproofing structure 2 of the shielded cable 1, the rubber waterproofing plug 5 for covering the waterproofed portion of the two coated cables 3 is indispensable. Thus, the number of parts and man-hours are increased to result in high cost, and the structure is made complicated and heavier.

The present application is made to solve the above problems, and has an object to provide a waterproofing structure and a waterproofing method for a shielded cable that are capable of reducing the number of parts and the man-hours to reduce cost, and to make the whole structure more compact and lighter.

A waterproofing structure for shielded cable according a first aspect of the present application includes: a shielded cable including one or more cables and a braided wire serving as a shielding member and covering the cables; and a waterproofing member covering a waterproofed portion of the braided wire. A waterproofing filler is disposed on at least one of an inner side and an outer side of a waterproofed portion of the braided wire. At least gaps between a plurality of strands of the braided wire out of the gaps between the plurality of strands of the braided wire and a gap between the braided wire and the waterproofing member are filled with the waterproofing filler.

A waterproofing method for shielded cable according a second aspect of the present application includes: when covering a waterproofed portion of a shielded cable including one or more cables and a braided wire serving as a shielding member and covering the cables, with a waterproofing member; disposing a waterproofing filler on at least one of an inside and an outside of the braided wire in the waterproofed portion on the shielded cable; filling at least gaps between a plurality of strands of the braided wire out of the gap between the plurality of strands of the braided wire and a gap between the braided wire and the waterproofing member with the waterproofing filler; and pressurizing the waterproofed portion filled with the waterproofing filler by tightening by the waterproofing member such that a gap is not generated.

With the waterproofing structure for shielded cable according to the first aspect of the present application and the waterproofing method for shielded cable according to the second aspect of the present application, it is only necessary to fill at least the gaps between the plurality of strands of the braided wire out of the gaps between the plurality of strands of the braided wire and the gap between the braided wire and the waterproofing member with the waterproofing filler. Thus, it is possible to reduce the number of parts and man-hours to reduce cost, and to make the whole structure more compact and lighter.

DESCRIPTION OF EMBODIMENTS

Hereinafter, embodiments will be described with reference to the drawings.

First Embodiment

Figure 1:
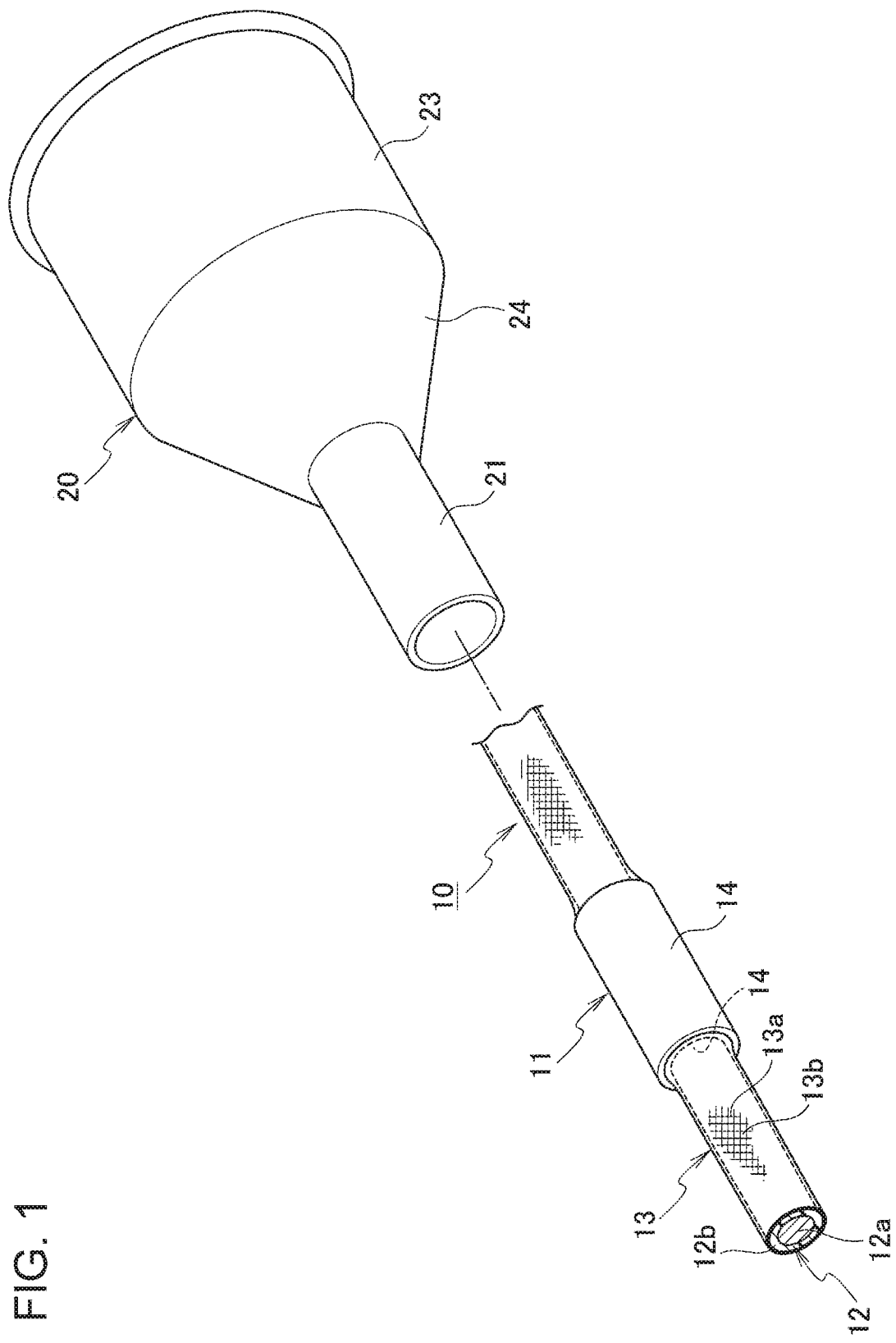
FIG. 1 is an exploded perspective view of a waterproofing structure for a shielded cable according to a first embodiment.
Figure 2:
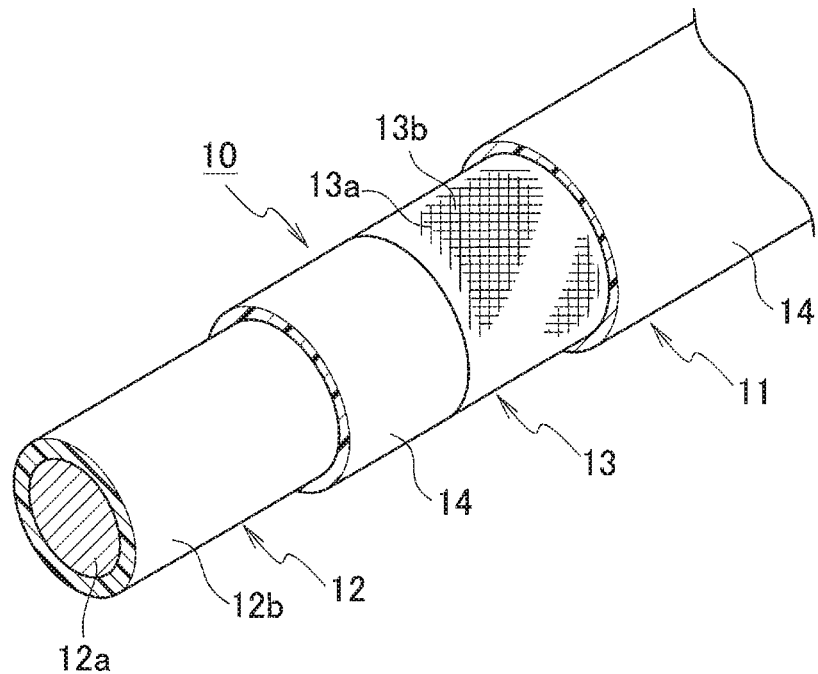
FIG. 2 is a partially broken perspective view of a main portion before waterproofing of the shielded cable in FIG. 1.
Figure 3:
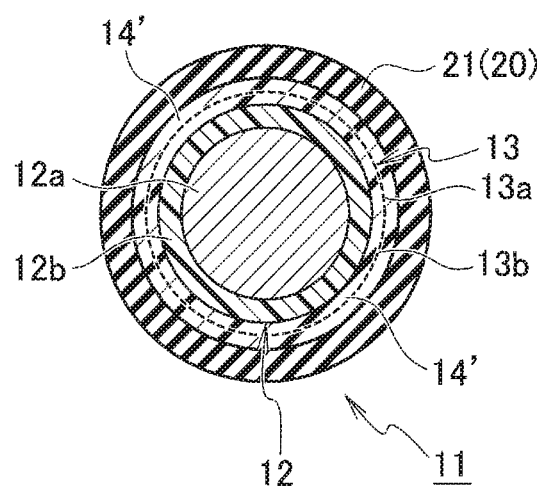
FIG. 3 is a cross-sectional view of the waterproofing structure for the shielded cable in FIG. 1.

With reference to FIGS. 1 to 3, a waterproofing structure for a shielded cable according to a first embodiment will be described.

As illustrated in FIGS. 1 and 2, in the first embodiment, a shielded cable 10 includes a coated cable 12 and a conductive and tubular braided wire 13 as a shielding member for covering the coated cable 12, and has a sheathless structure in which the outside of the braided wire 13 is not covered with an insulating sheath. The shielded cable 10 is used as a harness for low voltage for power feeding, wiring, and the like of various vehicles such as a hybrid electric vehicle (HEV) and an electric vehicle (EV), for example.

The waterproofing structure 11 for the shielded cable 10 according to the first embodiment includes a shielded cable 10 having a part (e.g. a portion where there is a risk of infiltration based on past infiltration cases) that is subjected to waterproofing treatment and a rubber grommet 20 as a waterproofing member for covering a waterproofed portion of the braided wire 13 of the shielded cable 10.

More specifically, as illustrated in FIGS. 1 to 3, the coated cable 12 includes a core wire 12a at the center and an insulating coating 12b that is formed of an insulator such as an insulating resin and covers the outer periphery of the core wire 12a. On the inner side and the outer side of the waterproofed portion (a portion facing a cylindrical small-diameter cylindrical portion 21 of the grommet 20) of the braided wire 13 for covering the coated cable 12, a tubular or sheet-shaped thermoplastic resin 14 is disposed as a waterproofing filler.

Then, as illustrated in FIG. 3, each of gaps 13b between a plurality of strands 13a of the braided wire 13 and a gap between the braided wire 13 and the cylindrical small-diameter cylindrical portion 21 of the grommet 20, thermoplastic resin 14' melted by heating is filled. Furthermore, the pressurization generated by tightening by the elastic force of the small-diameter cylindrical portion 21 of the grommet 20 causes the melted thermoplastic resin 14' to reliably permeate each of the above-described gaps and fill each of the gaps, and each of the gaps is blocked.

The braided wire 13 is a shielding member counteracting electromagnetic waves that is formed by braiding a plurality of conductive strands 13a into a tubular shape to shield an electromagnetic noise. The tubular or sheet-shaped thermoplastic resin 14 positioned on the inner side of the waterproofed portion of the braided wire 13 (the outer circumferential side of the coated cable 12) may be previously disposed on the coated cable 12 before it is covered with the braided wire 13, or may be disposed on the outer circumferential side of the coated cable 12 with the braided wire 13 turned up when the coated cable 12 is already covered with the braided wire 13. The grommet 20 includes the small-diameter cylindrical portion 21 having a cylindrical shape, a large-diameter cylindrical portion 23 having a cylindrical shape, and an intermediate portion 24 having a conical cylindrical shape and connecting the small-diameter cylindrical portion 21 and the large-diameter cylindrical portion 23. Then, the waterproofing structure 11 of the shielded cable 10 prevents infiltration of water from the outside of the vehicle compartment on the side of the small-diameter cylindrical portion 21 of the grommet 20 to the inside of the vehicle compartment on the side of the large-diameter cylindrical portion 23 of the grommet 20.

In the waterproofing structure 11 for the shielded cable 10 according to the first embodiment, when the waterproofed portion of the shielded cable 10 including the coated cable 12 and the tubular braided wire 13 as a shielding member for covering the coated cable 12 is covered with the small-diameter cylindrical portion 21, first, the tubular or sheet-shaped thermoplastic resins 14 are disposed on the inner side and outer side of the braided wire 13 respectively in the waterproofed portion of the shielded cable 10. Next, each of the gaps 13b between the plurality of strands 13a of the braided wire 13 and the gap between the braided wire 13 and the small-diameter cylindrical portion 21 is filled with the thermoplastic resin 14' melted by heating, and the waterproofed portion is tightened by the elastic force of the small-diameter cylindrical portion 21. In this way, the melted thermoplastic resin 14' reliably fills each of the above-mentioned gaps, whereby the waterproofing structure 11 for the shielded cable 10 is manufactured. This can easily and reliably prevent infiltration of water from the outside of the vehicle compartment on the side of the small-diameter cylindrical portion 21 of the grommet 20 to the inside of the vehicle compartment on the side of the large-diameter cylindrical portion 23 of the grommet 20.

The waterproofing structure 11 for the shielded cable 10 according to the first embodiment only has to fill the gaps 13b between the plurality of strands 13a of the braided wire 13 in the entire region of the waterproofed portion and the gap between the braided wire 13 and the small-diameter cylindrical portion 21 with the melted thermoplastic resin 14', without using a part such as a rubber waterproofing plug as used in the conventional example. Therefore, the waterproofing structure 11 for the shielded cable 10 according to the first embodiment enables to reduce the number of parts and man-hours to reduce cost, and to make the whole structure more compact and lighter.

In the waterproofing structure 11 for the shielded cable 10 according to the first embodiment, tubular or sheet-shaped thermoplastic resins 14 are disposed on the inner side and the outer side of the waterproofed portion of the braided wire 13 respectively as waterproofing fillers, but may be disposed only on the inner side or only on the outer side of the waterproofed portion of the braided wire 13. In addition, as the thermoplastic resin 14, an adhesive that melts by heating to flow into the gaps and solidifies by cooling to stick the surrounding parts to each other (e.g. "Product Name: Hot Melt Adhesive" manufactured by Cemedine Co., Ltd.) may be used.

Second Embodiment

Figure 4:
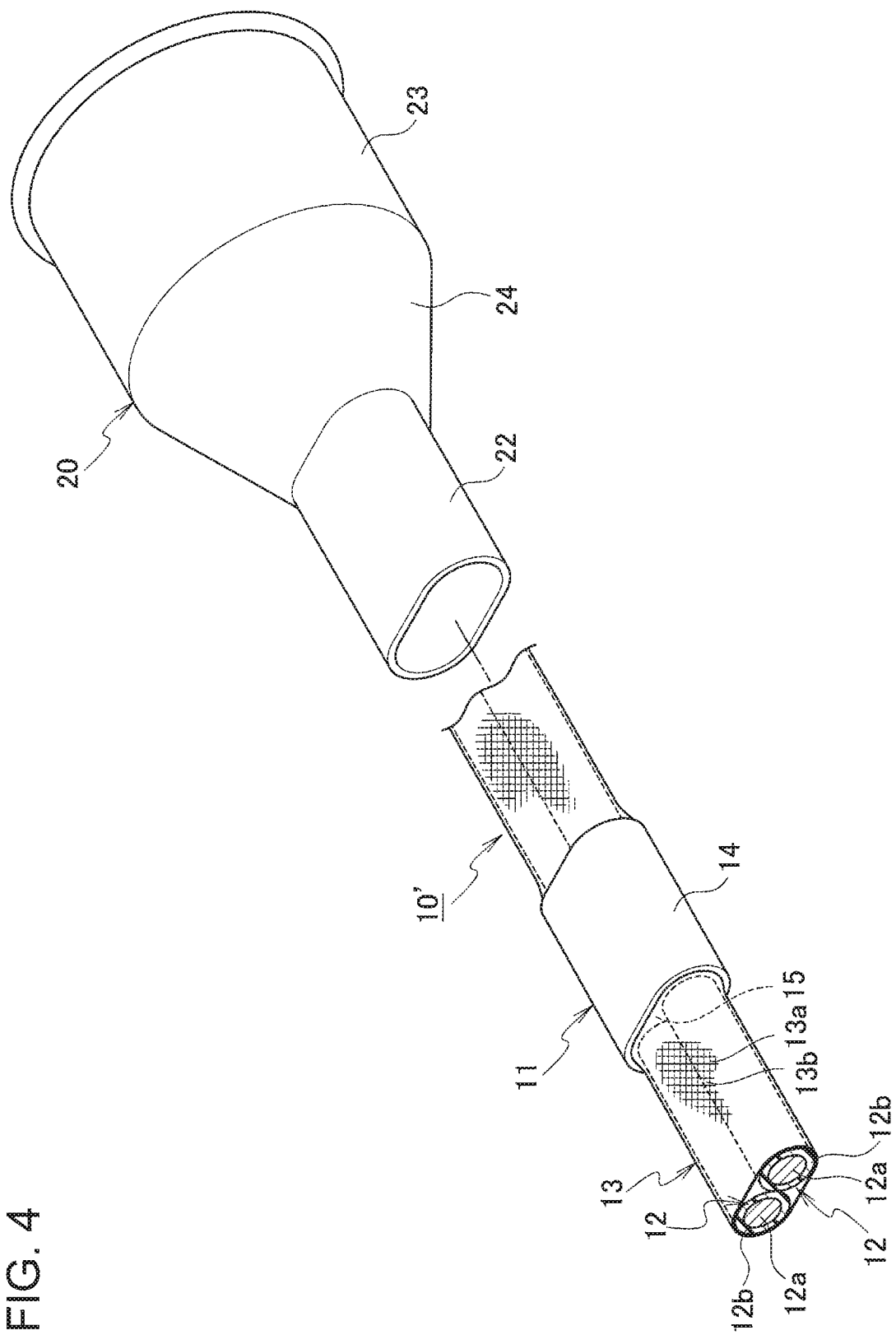
FIG. 4 is a partially broken exploded perspective view of a waterproofing structure for a shielded cable according to a second embodiment.
Figure 5:
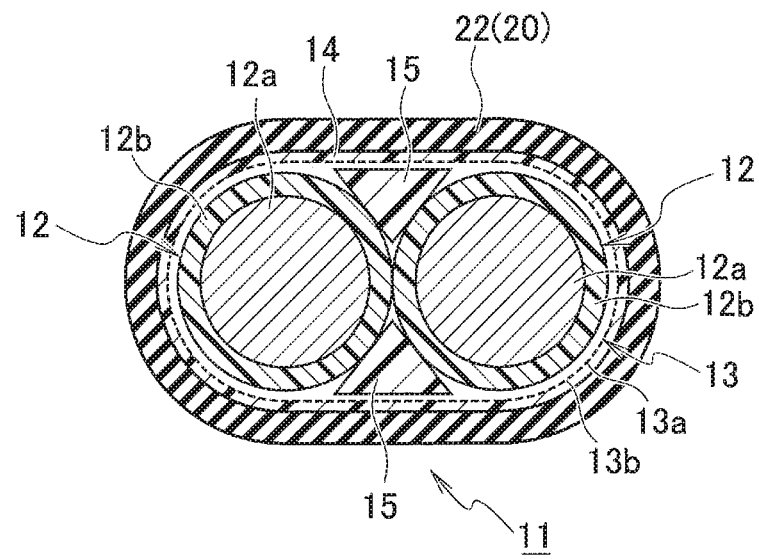
FIG. 5 is a cross-sectional view of a main portion before waterproofing of the shielded cable in FIG. 4.
Figure 6:
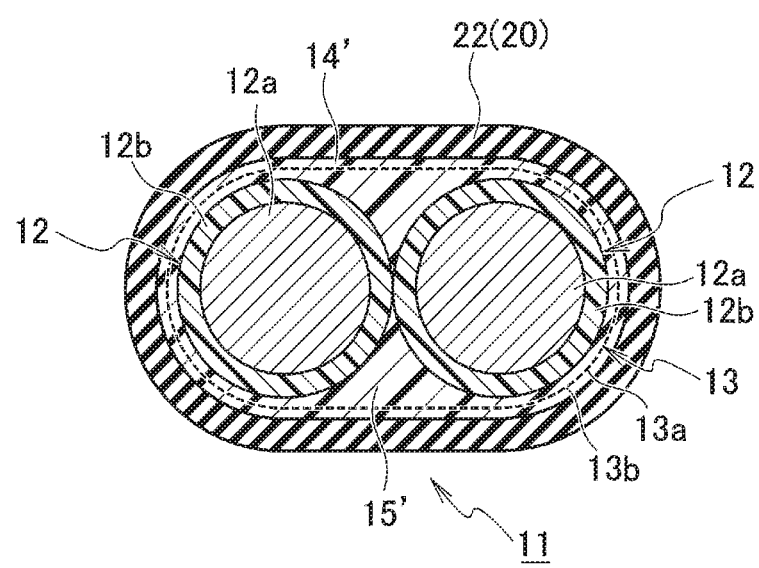
FIG. 6 is a cross-sectional view of the waterproofing structure for the shielded cable in FIG. 4.

With reference to FIGS. 4 to 6, a waterproofing structure for a shielded cable according to a second embodiment will be described.

As illustrated in FIGS. 4 and 5, in the second embodiment, a shielded cable 10' includes two coated cables 12 and a conductive and tubular braided wire 13 as a shielding member for collectively covering the two coated cables 12, and has a sheathless structure in which the outside of the braided wire 13 is not covered with an insulating sheath. The shielded cable 10' is used, for example, as a harness for high voltage for power feeding, wiring, and the like of various vehicles such as an HEV and an EV. In the first embodiment, the coated cable 12 is used, whereas in the second embodiment, the two coated cables 12 are used, which is a big difference.

The waterproofing structure 11 for the shielded cable 10' according to the second embodiment includes a shielded cable 10' having a part (e.g. a portion where there is a risk of infiltration based on past infiltration cases) that is subjected to waterproofing treatment and a rubber grommet 20 as a waterproofing member for covering a waterproofed portion of the braided wire 13 of the shielded cable 10'.

More specifically, as illustrated in FIGS. 4 to 6, each of the coated cables 12 includes a core wire 12a at the center and an insulating coating 12b that is formed of an insulator such as an insulating resin and covers the outer periphery of the core wire 12a. On the outer side of the waterproofed portion (a portion facing the elliptic cylindrical small-diameter cylindrical portion 22 of the grommet 20) of the braided wire 13 for collectively covering the two coated cables 12, a tubular or sheet-shaped first thermoplastic resin 14 is disposed as a waterproofing filler, and in the upper and lower gaps between the two coated cables 12, triangular bar-shaped second thermoplastic resins 15 are disposed as waterproofing fillers.

Then, as illustrated in FIG. 6, the first thermoplastic resin 14' and the second thermoplastic resin 15' melted by heating respectively fill the gaps 13b between the plurality of strands 13a of the braided wire 13, the gap between the braided wire 13 and the elliptic cylindrical small-diameter cylindrical portion 22 of the grommet 20, and the gaps between the two coated cables 12. Furthermore, the pressurization generated by tightening by the elastic force of the small-diameter cylindrical portion 22 of the grommet 20 causes the melted first thermoplastic resin 14' and second thermoplastic resin 15' to reliably permeate each of the above-described gaps and fill each of the gaps and each of the gaps is blocked.

The grommet 20 includes a small-diameter cylindrical portion 22 having an elliptic cylindrical shape, a large-diameter cylindrical portion 23 having a cylindrical shape, and an intermediate portion 24 having a conical cylindrical shape and connecting the small-diameter cylindrical portion 22 and the large-diameter cylindrical portion 23. Then, the waterproofing structure 11 of the shielded cable 10' prevents infiltration of water from the outside of the vehicle compartment on the side of the small-diameter cylindrical portion 22 of the grommet 20 to the inside of the vehicle compartment on the side of the large-diameter cylindrical portion 23 of the grommet 20.

In the waterproofing structure 11 for the shielded cable 10' according to the second embodiment, when the waterproofed portion of the shielded cable 10' including the two coated cables 12 and the tubular braided wire 13 as a shielding member for collectively covering the two coated cables 12 is covered with the small-diameter cylindrical portion 22, first, the tubular or sheet-shaped thermoplastic resin 14 is disposed on the outer side of the braided wire 13 in the waterproofed portion of the shielded cable 10', and the two triangular bar-shaped thermoplastic resins 15 are disposed in the gaps between the two coated cables 12. Next, the gaps 13b between the plurality of strands 13a of the braided wire 13, the gap between the braided wire 13 and the small-diameter cylindrical portion 22, and the gaps between the two coated cables 12 are respectively filled with the first thermoplastic resin 14' and the second thermoplastic resin 15' melted by heating, and the waterproofed portion is tightened by the elastic force of the small-diameter cylindrical portion 22. With this configuration, the melted first thermoplastic resin 14' and second thermoplastic resin 15' reliably fill each of the above gaps, whereby the waterproofing structure 11 for the shielded cable 10' is manufactured. This can easily and reliably prevent infiltration of water from the outside of the vehicle compartment on the side of the small-diameter cylindrical portion 22 of the grommet 20 to the inside of the vehicle compartment on the side of the large-diameter cylindrical portion 23 of the grommet 20.

The waterproofing structure 11 for the shielded cable 10' according to the second embodiment only has to fill the gaps 13b between the plurality of strands 13a of the braided wire 13 in the entire region of the waterproofed portion, the gap between the braided wire 13 and the small-diameter cylindrical portion 22, and the gaps between the two coated cables 12 with the melted first thermoplastic resin 14' and second thermoplastic resin 15', without using a part such as a rubber waterproofing plug as used in the conventional example. Therefore, the waterproofing structure 11 for the shielded cable 10' according to the second embodiment enables to reduce the number of parts and man-hours to reduce cost, and to make the whole structure more compact and lighter.

In addition, when the shielded cable 10 having the waterproofing structure 11 according to the first embodiment and the shielded cable 10' having the waterproofing structure 11 according to the second embodiment are bundled and used as a wire harness for power feeding, wiring, and the like of various vehicles such as an HEV and an EV, it is possible to reduce a space for wiring to the vehicle to save space.

In the second embodiment, the triangular bar-shaped second thermoplastic resins 15 are disposed as waterproofing fillers in the gaps between the two coated cables 12, but a granular thermoplastic resin may fill the gaps between the two coated cables 12 as a waterproofing filler. As the triangular bar-shaped second thermoplastic resins 15 or the granular thermoplastic resin, an adhesive that has a fixed shape at room temperature, melts by heating to flow into the gaps, and solidifies by cooling to stick the surrounding parts to each other (e.g. "Product Name: Hot Melt Adhesive" manufactured by Cemedine Co., Ltd.) may be used. In addition, the number of the coated cables 12 shielded by the braided wire 13 is not limited to two, and may be three or more.

Third Embodiment

Figure 7:
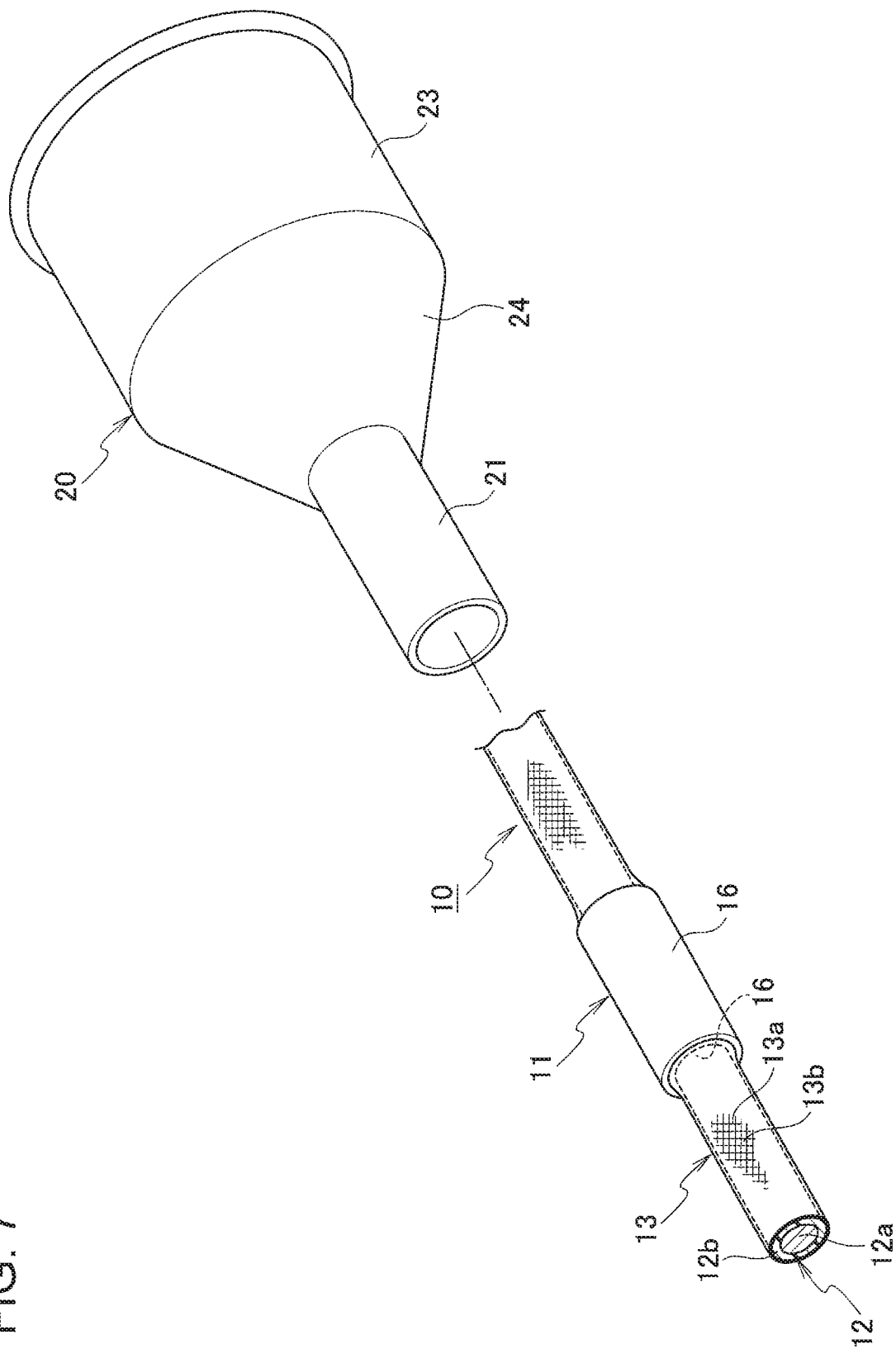
FIG. 7 is an exploded perspective view of a waterproofing structure for a shielded cable according to a third embodiment.
Figure 8:
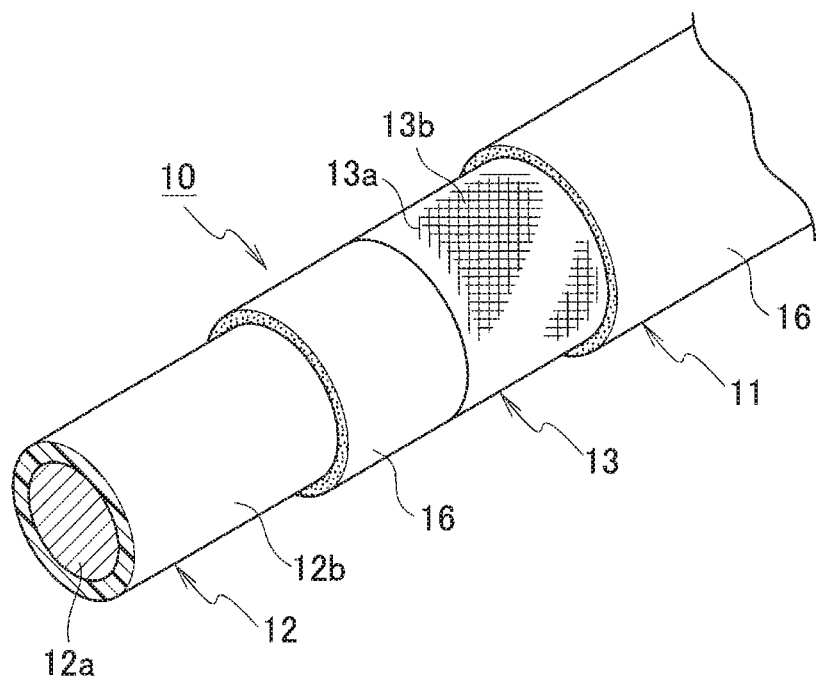
FIG. 8 is a partially broken perspective view of a main portion before waterproofing of the shielded cable in FIG. 7.
Figure 9:
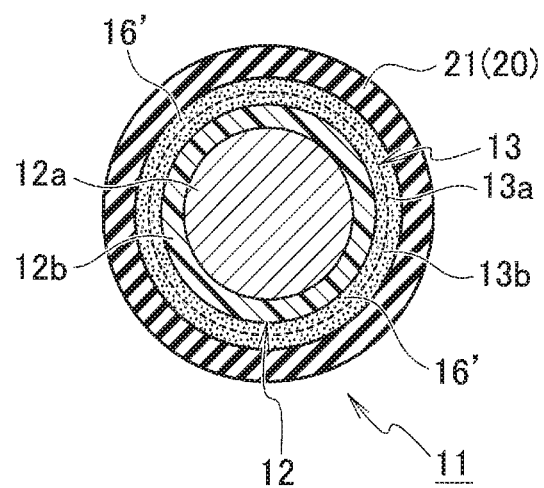
FIG. 9 is a cross-sectional view of the waterproofing structure for the shielded cable in FIG. 7.

With reference to FIGS. 7 to 9, a waterproofing structure for a shielded cable according to a third embodiment will be described.

As illustrated in FIGS. 7 and 8, in the third embodiment, a shielded cable 10 includes coated cable 12 and a conductive and tubular braided wire 13 as a shielding member for covering the coated cable 12, and has a sheathless structure in which the outside of the braided wire 13 is not covered with an insulating sheath. The shielded cable 10 is used, for example, as a harness for low voltage for power feeding, wiring, and the like of various vehicles such as an HEV and an EV.

The waterproofing structure 11 for the shielded cable 10 according to the third embodiment includes a shielded cable 10 having a part (e.g. a portion where there is a risk of infiltration based on past infiltration cases) that is subjected to waterproofing treatment and a rubber grommet 20 as a waterproofing member for covering a waterproofed portion of the braided wire 13 of the shielded cable 10.

More specifically, as illustrated in FIGS. 7 to 9, the coated cable 12 includes a core wire 12a at the center and an insulating coating 12b that is formed of an insulator such as an insulating resin and covers the outer periphery of the core wire 12a. On each of the inner side and the outer side of the waterproofed portion (a portion facing the cylindrical small-diameter cylindrical portion 21 of the grommet 20) of the braided wire 13 for covering the coated cable 12, a sheet-shaped or pasty swelling agents 16 to be swelled by water absorption are disposed as waterproofing fillers.

Then, as illustrated in FIG. 9, each of the gaps 13b between a plurality of strands 13a of the braided wire 13 and the gap between the braided wire 13 and the cylindrical small-diameter cylindrical portion 21 of the grommet 20 is filled with swelling agents 16' swelled by water absorption. Furthermore, the pressurization generated by tightening by the elastic force of the small-diameter cylindrical portion 21 of the grommet 20 causes the swelling agents 16' swelled by water absorption to reliably fill each of the above-described gaps, and each of the gaps is blocked.

The braided wire 13 is a shielding member counteracting electromagnetic waves that is formed by braiding a plurality of conductive strands 13a into a tubular shape to shield an electromagnetic noise. The sheet-shaped or pasty swelling agent 16 to be swelled by water absorption positioned on the inner side of the waterproofed portion of the braided wire 13 (the outer circumferential side of the coated cable 12) may be previously disposed on the coated cable 12 before the braided wire 13 is covered, or may be disposed on the outer circumferential side of the coated cable 12 with the braided wire 13 turned up when the coated cable 12 is already covered with the braided wire 13. The grommet 20 includes a small-diameter cylindrical portion 21 having a cylindrical shape, a large-diameter cylindrical portion 23 having a cylindrical shape, and an intermediate portion 24 having a conical cylindrical shape and connecting the small-diameter cylindrical portion 21 and the large-diameter cylindrical portion 23. Then, the waterproofing structure 11 for the shielded cable 10 according to the third embodiment prevents infiltration of water from the outside of the vehicle compartment on the side of the small-diameter cylindrical portion 21 of the grommet 20 to the inside of the vehicle compartment on the side of the large-diameter cylindrical portion 23 of the grommet 20.

In the waterproofing structure 11 for the shielded cable 10 according to the third embodiment, when the waterproofed portion of the shielded cable 10 including the coated cable 12 and the tubular braided wire 13 as a shielding member for covering the coated cable 12 is covered with the small-diameter cylindrical portion 21, first, the sheet-shaped or pasty swelling agents 16 to be swelled by water absorption are disposed on the inner side and outer side of the braided wire 13 respectively in the waterproofed portion of the shielded cable 10. Next, each of the gaps 13b between the plurality of strands 13a of the braided wire 13 and the gap between the braided wire 13 and the small-diameter cylindrical portion 21 is filled with the swelling agents 16' swelled by water absorption, and the waterproofed portion is tightened by the elastic force of the small-diameter cylindrical portion 21. In this way, the swelling agents 16' swelled by water absorption reliably fill each of the above-mentioned gaps, whereby the waterproofing structure 11 for the shielded cable 10 is manufactured. This can easily and reliably prevent infiltration of water from the outside of the vehicle compartment on the side of the small-diameter cylindrical portion 21 of the grommet 20 to the inside of the vehicle compartment on the side of the large-diameter cylindrical portion 23 of the grommet 20.

The waterproofing structure 11 for the shielded cable 10 according to the third embodiment only has to fill the gaps 13b between the plurality of strands 13a of the braided wire 13 in the entire region of the waterproofed portion and the gap between the braided wire 13 and the small-diameter cylindrical portion 21 with the swelling agents 16 swelled by water absorption, without using a part such as a rubber waterproofing plug as used in the conventional example. Therefore, the waterproofing structure 11 for the shielded cable 10 according to the third embodiment enables to reduce the number of parts and man-hours to reduce cost, and to make the whole structure more compact and lighter.

The shielded cable 10 having the waterproofing structure 11 may be shipped with the swelling agents 16 swelled in advance, or the swelling agents 16 may be swelled by water absorption under usage conditions (e.g. when the shielded cable 10 is wet with rain) after assembly of the vehicle. Even when the swelling agents 16 shrink due to dryness, the swelling agents 16 are swelled again by water absorption, so that waterproofing is not impeded at all and it is possible to sufficiently exert waterproofing.

In the waterproofing structure 11 the shielded cable 10 according to the third embodiment, the sheet-shaped or pasty swelling agents 16 to be swelled by water absorption are disposed on the inner side and the outer side of the waterproofed portion of the braided wire 13 respectively as waterproofing fillers, but may be disposed only on the inner side or only on the outer side of the waterproofed portion of the braided wire 13. As the sheet-shaped swelling agent, a swelling agent that is stuck to a waterproofed portion and swells about ten times when brought into contact with water to block the gaps (e.g. "Product Name: Chemica Sheet" manufactured by Nippon Chemical Paint Co., Ltd.) may be used. In addition, as the pasty swelling agent, a swelling agent that is uniformly applied to the waterproofed portion or sandwiched between parts and swells about twenty times when brought into contact with water to block the gaps (e.g. "Product Name: Pilelock" manufactured by Nippon Chemical Paint Co., Ltd.) may be used.

Fourth Embodiment

Figure 10:
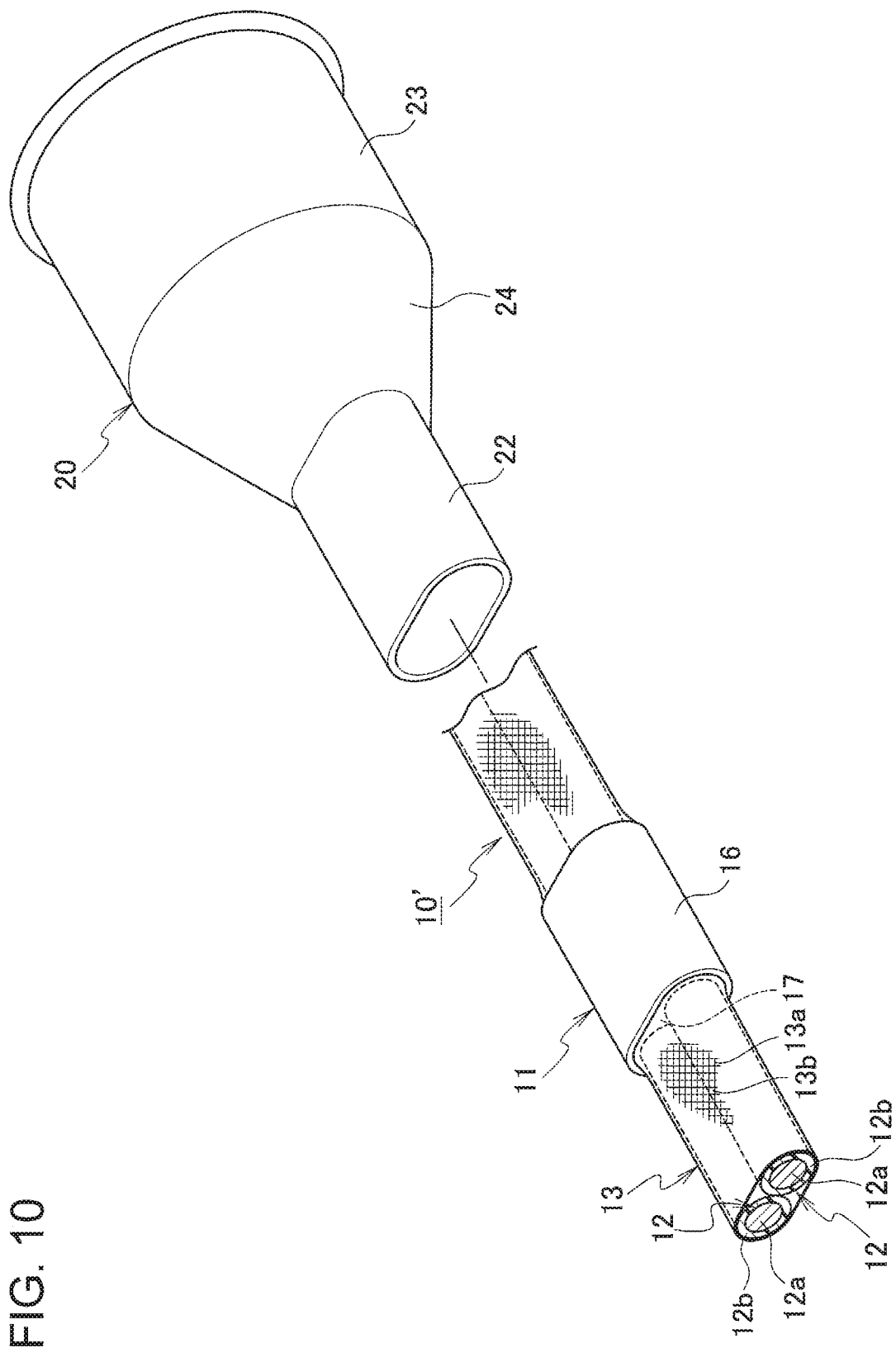
FIG. 10 is an exploded perspective view of a waterproofing structure for a shielded cable according to a fourth embodiment.
Figure 11:
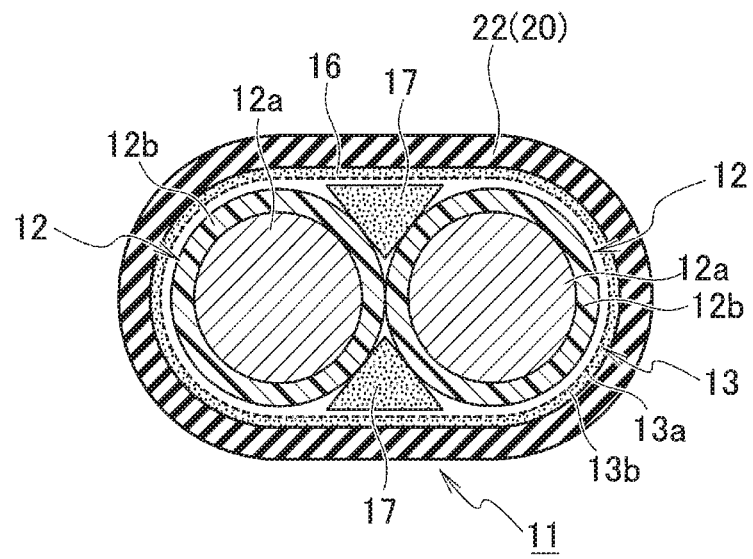
FIG. 11 is a cross-sectional view of a main portion before waterproofing of the shielded cable in FIG. 10.
Figure 12:
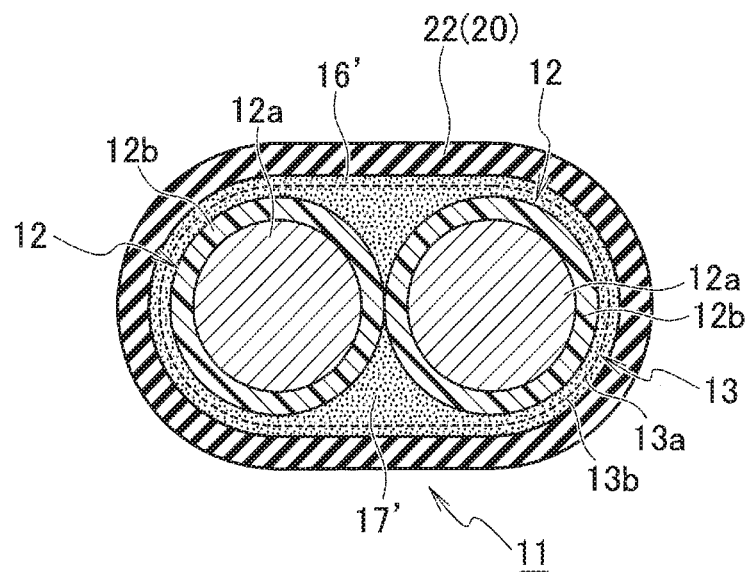
FIG. 12 is a cross-sectional view of the waterproofing structure for the shielded cable in FIG. 10.

With reference to FIGS. 10 to 12, a waterproofing structure for a shielded cable according to a fourth embodiment will be described.

As illustrated in FIGS. 10 and 11, in the fourth embodiment, a shielded cable 10' includes two coated cables 12 and a conductive and tubular braided wire 13 as a shielding member for collectively covering the two coated cables 12, and has a sheathless structure in which the outside of the braided wire 13 is not covered with an insulating sheath. The shielded cable 10' is used, for example, as a harness for high voltage for power feeding, wiring, and the like of various vehicles such as an HEV and an BY. In the third embodiment, the coated cable 12 is used, whereas in the fourth embodiment, the two coated cables 12 are used, which is a big difference.

The waterproofing structure 11 for the shielded cable 10' according to the fourth embodiment includes a shielded cable 10' having a part (e.g. a portion where there is a risk of infiltration based on past infiltration cases) that is subjected to waterproofing treatment and a rubber grommet 20 as a waterproofing member for covering a waterproofed portion of the braided wire 13 of the shielded cable 10'.

More specifically, as illustrated in FIGS. 10 to 12, each of the coated cables 12 includes a core wire 12a at the center and an insulating coating 12b that is formed of an insulator such as an insulating resin and covers the outer periphery of the core wire 12a. On the outer side of the waterproofed portion (a portion facing a small-diameter cylindrical portion 22 of the grommet 20) of the braided wire 13 for collectively covering the two coated cables 12, a sheet-shaped or pasty first swelling agent 16 to be swelled by water absorption is disposed as a waterproofing filler, and in the upper and lower gaps between the two coated cables 12, triangular bar-shaped or pasty second swelling agents 17 to be swelled by water absorption are disposed as waterproofing fillers.

Then, as illustrated in FIG. 12, the first swelling agent 16' and the second swelling agent 17' swelled by water absorption respectively fill the gaps 13b between the plurality of strands 13a of the braided wire 13, the gap between the braided wire 13 and the small-diameter cylindrical portion 22 of the grommet 20, and the gaps between the two coated cables 12. Furthermore, the pressurization generated by tightening by the elastic force of the small-diameter cylindrical portion 22 of the grommet 20 causes the first swelling agent 16' and second swelling agent 17' swelled by water absorption to reliably fill each of the above-described gaps, and each of the gaps is blocked.

The grommet 20 includes the small-diameter cylindrical portion 22 having an elliptic cylindrical shape, a large-diameter cylindrical portion 23 having a cylindrical shape, and a intermediate portion 24 having a conical cylindrical shape and connecting the small-diameter cylindrical portion 22 and the large-diameter cylindrical portion 23. Then, the waterproofing structure 11 for the shielded cable 10' according to the fourth embodiment prevents infiltration of water from the outside of the vehicle compartment on the side of the small-diameter cylindrical portion 22 of the grommet 20 to the inside of the vehicle compartment on the side of the large-diameter cylindrical portion 23 of the grommet 20.

In the waterproofing structure 11 for the shielded cable 10' according to the fourth embodiment, when the waterproofed portion of the shielded cable 10' including the two coated cables 12 and the tubular braided wire 13 as a shielding member for covering the two coated cables 12 is covered with the small-diameter cylindrical portion 22, first, the sheet-shaped or pasty swelling agent 16 to be swelled by water absorption is disposed on the outer side of the braided wire 13 in the waterproofed portion of the shielded cable 10', and the triangular bar-shaped or pasty swelling agents 17 to be swelled by water absorption are disposed in the gaps between the two coated cables 12. Next, the gaps 13b between the plurality of strands 13a of the braided wire 13, the gap between the braided wire 13 and the small-diameter cylindrical portion 22, and the gaps between the two coated cables 12 are respectively filled with the first swelling agent 16' and the second swelling agent 17' swelled by water absorption, and the waterproofed portion is tightened by the elastic force of the small-diameter cylindrical portion 22. In this way, the first swelling agent 16' and the second swelling agent 17' swelled by water absorption reliably fill each of the above-mentioned gaps, whereby the waterproofing structure 11 for the shielded cable 10' is manufactured. This can easily and reliably prevent infiltration of water from the outside of the vehicle compartment on the side of the small-diameter cylindrical portion 22 of the grommet 20 to the inside of the vehicle compartment on the side of the large-diameter cylindrical portion 23 of the grommet 20.

The waterproofing structure 11 for the shielded cable 10' according to the fourth embodiment only has to fill the gaps 13b between the plurality of strands 13a of the braided wire 13 in the entire region of the waterproofed portion, the gap between the braided wire 13 and the small-diameter cylindrical portion 22, and the gaps between the two coated cables 12 with the first swelling agent 16 and the second swelling agent 17 swelled by water absorption, without using a part such as a rubber waterproofing plug as used in the conventional example. Therefore, the waterproofing structure 11 for the shielded cable 10' according to the fourth embodiment enables to reduce the number of parts and man-hours to reduce cost, and to make the whole structure more compact and lighter.

In addition, the shielded cable 10' having the waterproofing structure 11 may be shipped with the first swelling agent 16 and the second swelling agent 17 swelled in advance, and furthermore, the first swelling agent 16 and the second swelling agent 17 may be swelled by water absorption under usage conditions (e.g. when the shielded cable 10' is wet with rain) after assembly of the vehicle. In addition, even when the first swelling agent 16 and the second swelling agent 17 shrink due to dryness, the first swelling agent 16 and the second swelling agent 17 are swelled again by water absorption, so that waterproofing is not impeded at all and it is possible to sufficiently exert waterproofing.

Then, when the shielded cable 10 having the waterproofing structure 11 according to the third embodiment and the shielded cable 10' having the waterproofing structure 11 according to the fourth embodiment are bundled and used as a wire harness for power feeding, wiring, and the like of various vehicles such as an HEV and an EV, it is possible to reduce a space for wiring space to the vehicle to save space.

In the fourth embodiment, as the triangular bar-shaped second swelling agents 17 as waterproofing fillers that fill the gaps between the two coated cables 12, a swelling agent that swells about twenty times when brought into contact with water to block the gaps (e.g. "Product Name: Pilelock" manufactured by Nippon Chemical Paint Co., Ltd.) may be used. In addition, the number of the coated cables 12 shielded by the braided wire 13 is not limited to two, and may be three or more.

Fifth Embodiment

Figure 13:
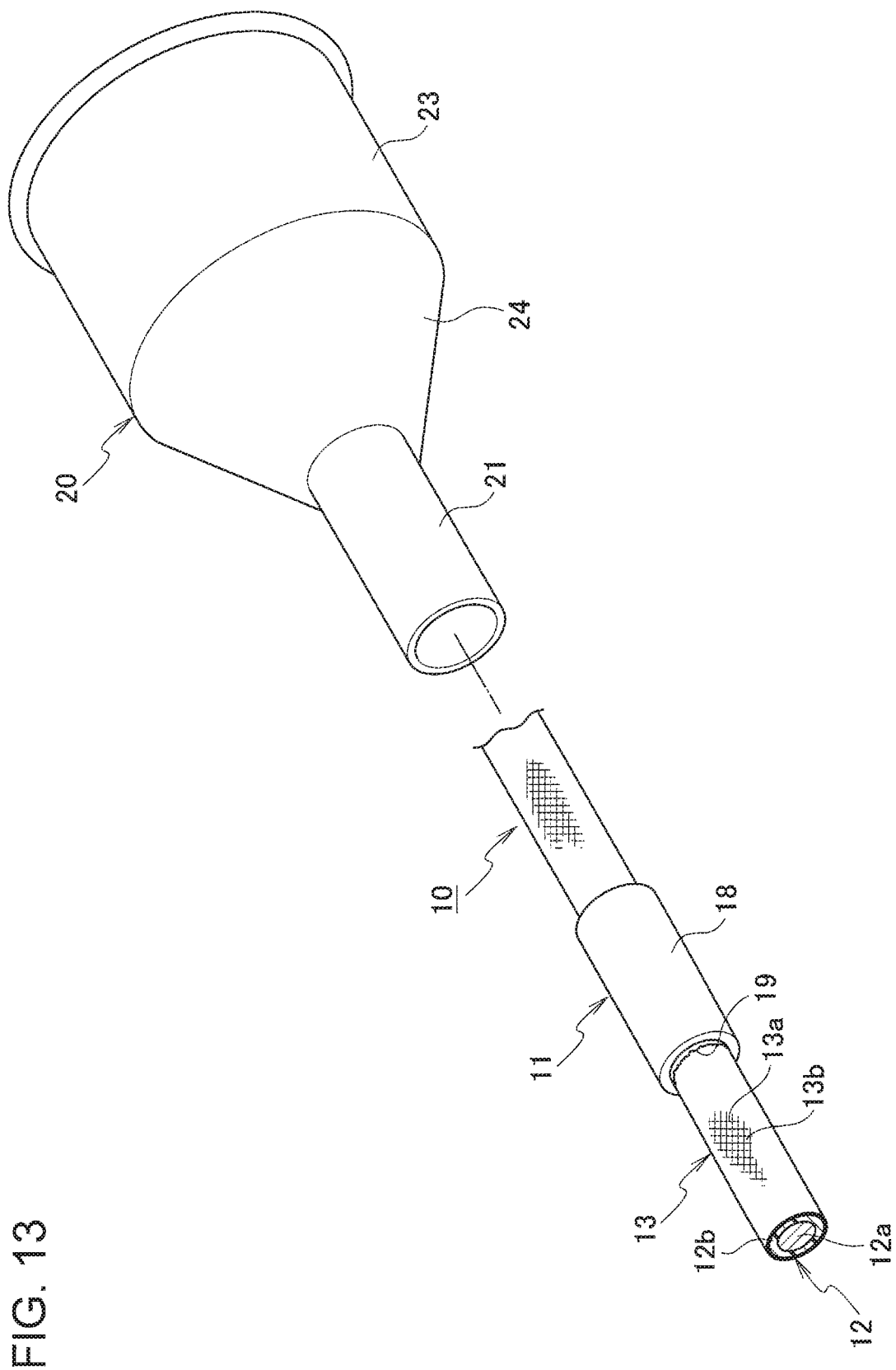
FIG. 13 is an exploded perspective view of a waterproofing structure for a shielded cable according to a fifth embodiment.
Figure 14:
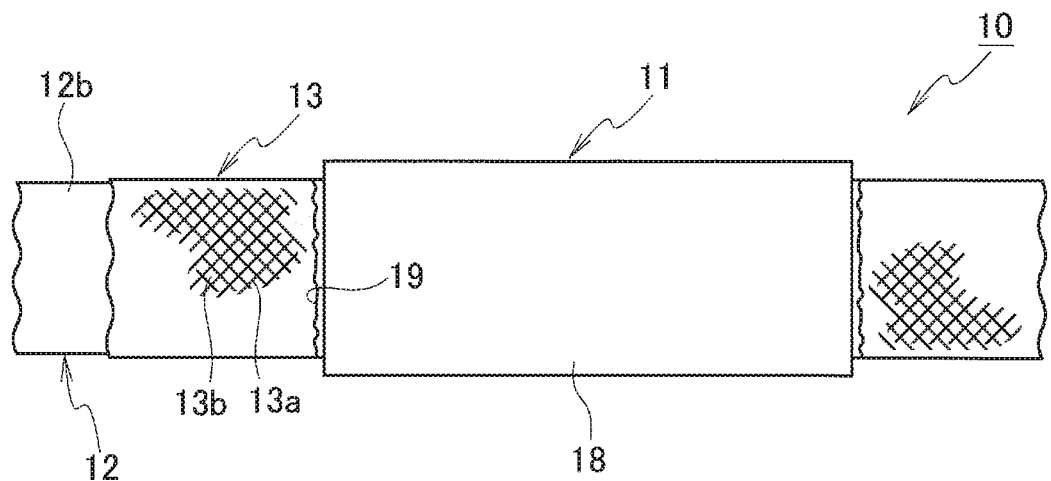
FIG. 14 is a plan view of a main portion of the waterproofing s for the shielded cable in FIG. 13.
Figure 15:
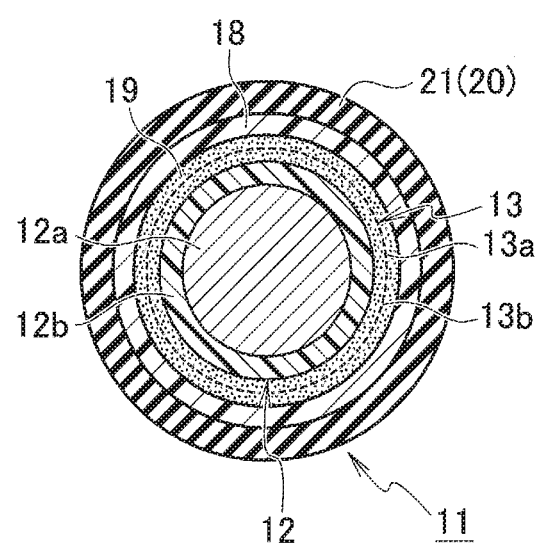
FIG. 15 is a cross-sectional view of the waterproofing structure for the shielded cable in FIG. 13.

With reference to FIGS. 13 to 15, a waterproofing structure for a shielded cable according to a fifth embodiment will be described.

As illustrated in FIGS. 13 and 14, in the fifth embodiment, a shielded cable 10 includes coated cable 12 and a conductive and tubular braided wire 13 as a shielding member for covering the coated cable 12, and has a sheathless structure in which the outside of the braided wire 13 is not covered with an insulating sheath. The shielded cable 10 is used, for example, as a harness for low voltage for power feeding, wiring, and the like of various vehicles such as an HEV and an EV.

The waterproofing structure 11 for the shielded cable 10 according to the fifth embodiment includes a shielded cable 10 having a part (e.g. a portion where there is a risk of infiltration based on past infiltration cases) that is subjected to waterproofing treatment and a rubber grommet 20 as a waterproofing member for covering a waterproofed portion of the braided wire 13 of the shielded cable 10.

More specifically, as illustrated in FIGS. 13 and 14, the coated cable 12 includes a core wire 12a at the center and an insulating coating 12b that is formed of an insulator such as an insulating resin and covers the outer periphery of the core wire 12a. On the outer side of the waterproofed portion (a portion facing a small-diameter cylindrical portion 21 of the grommet 20) of the braided wire 13 for covering the coated cable 12, a heat shrinkable tube 18 including pasty adhesive 19 applied to the inner circumferential surface as a waterproofing filler is disposed to surround the waterproofed portion of the braided wire 13.

Then, as illustrated in FIGS. 13 to 15, the adhesive 19 pushed into the braided wire 13 by the heat shrinkable tube 18 that is heat-shrunk by being heated to a predetermined temperature reliably permeates and fills the gaps 13b between the plurality of strands 13a of the braided wire 13, and the gaps 13b are blocked.

The braided wire 13 is a shielding member counteracting electromagnetic waves. The braided wire 13 is formed by braiding a plurality of conductive strands 13a into a tubular shape to shield an electromagnetic noise. The grommet 20 includes the small-diameter cylindrical portion 21 having a cylindrical shape, a large-diameter cylindrical portion 23 having a cylindrical shape, and an intermediate portion 24 having a conical cylindrical shape and connecting the small-diameter cylindrical portion 21 and the large-diameter cylindrical portion 23. The outer circumferential surface of the heat-shrunk heat shrinkable tube 18 and the inner circumferential surface of the small-diameter cylindrical portion 21 are blocked without any gap by a lip portion (not illustrated) that is formed integrally with the small-diameter cylindrical portion 21 to project from the inner circumferential surface of the small-diameter cylindrical portion 21. Then, the waterproofing structure 11 for the shielded cable 10 according to the fifth embodiment prevents infiltration of water from the outside of the vehicle compartment on the side of the small-diameter cylindrical portion 21 of the grommet 20 to the inside of the vehicle compartment on the side of the large-diameter cylindrical portion 23 of the grommet 20.

In the waterproofing structure 11 for the shielded cable 10 according to the fifth embodiment, when the waterproofed portion of the shielded cable 10 including the coated cable 12 and the tubular braided wire 13 as a shielding member for covering the coated cable 12 is covered with the small-diameter cylindrical portion 21, first, the heat shrinkable tube 18 including the pasty adhesive 19 applied to the inner circumferential surface is disposed on the outer side of the braided wire 13 in the waterproofed portion of the shielded cable 10 by inserting the braided wire 13. Next, the heat shrinkable tube 18 is heated and heat-shrunk to push the adhesive 19 applied to the inner circumferential surface of the heat shrinkable tube 18 into the gaps 13b between the plurality of strands 13a of the braided wire 13 to reliably fill the gaps 13b, and the inner circumferential surface of the small-diameter cylindrical portion 21 is pressed against the outer circumferential surface of the heat shrinkable tube 18 heat-shrunk by the elastic force of the small-diameter cylindrical portion 21 to achieve sealing, whereby the waterproofing structure 11 for the shielded cable 10 is manufactured. This can easily and reliably prevent infiltration of water from the outside of the vehicle compartment on the side of the small-diameter cylindrical portion 21 of the grommet 20 to the inside of the vehicle compartment on the side of the large-diameter cylindrical portion 23 of the grommet 20.

The waterproofing structure 11 for the shielded cable 10 according to the fifth embodiment only has to push the adhesive 19 by heat shrinkage of the heat shrinkable tube 18 into and fill the gaps 13b between the plurality of strands 13a of the braided wire 13 in the entire region of the waterproofed portion, without using a part such as a rubber waterproofing plug as used in the conventional example. Therefore, the waterproofing structure 11 for the shielded cable 10 according to the fifth embodiment enables to reduce the number of parts and man-hours to reduce cost, and to make the whole structure more compact and lighter.

Sixth Embodiment

Figure 16:
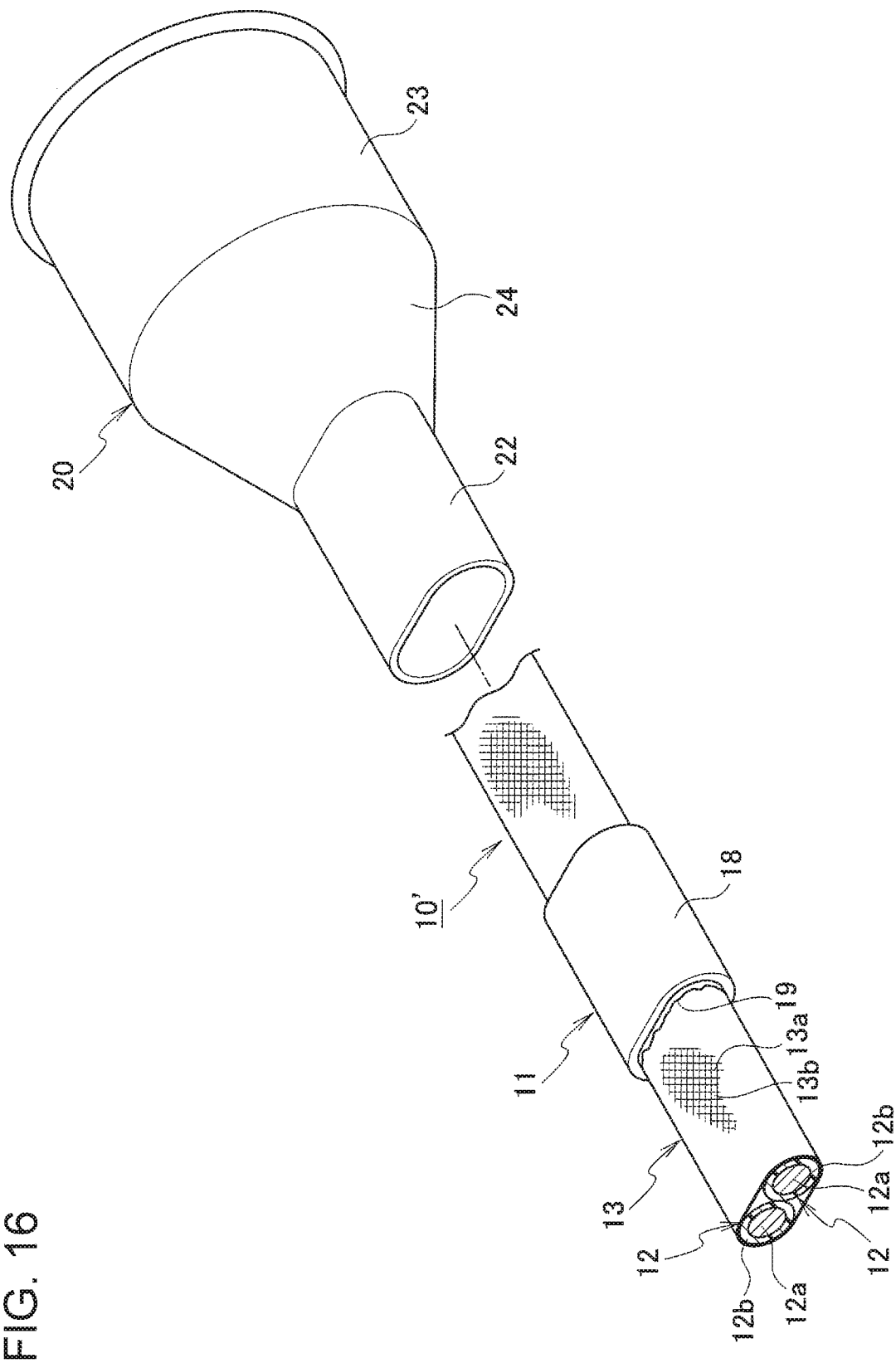
FIG. 16 is an exploded perspective view of a waterproofing structure for a shielded cable according to a sixth embodiment.
Figure 17:
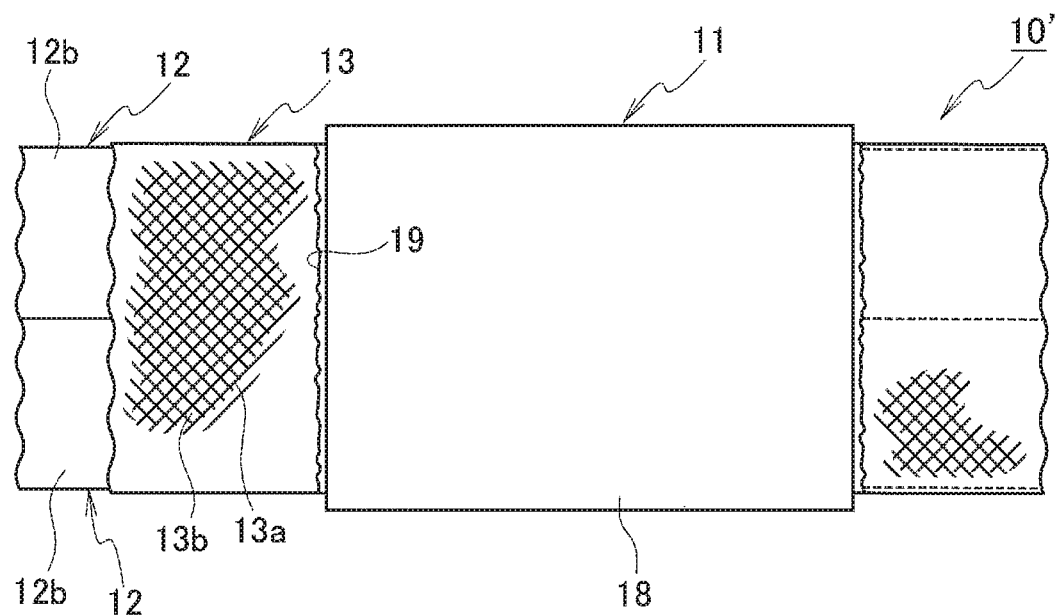
FIG. 17 is a plan view of a main portion of the waterproofing structure for the shielded cable in FIG. 16.
Figure 18:
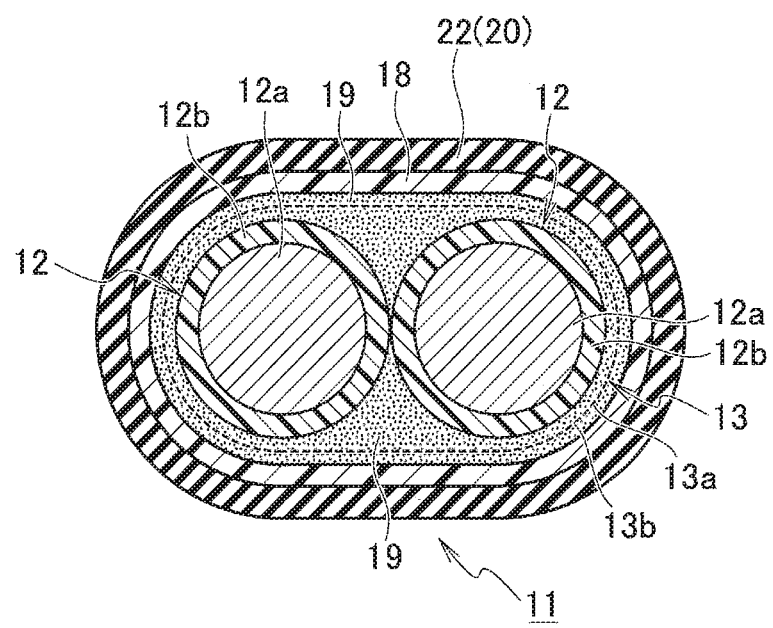
FIG. 18 is a cross-sectional view of the waterproofing structure for the shielded cable in FIG. 16.
Figure 19:
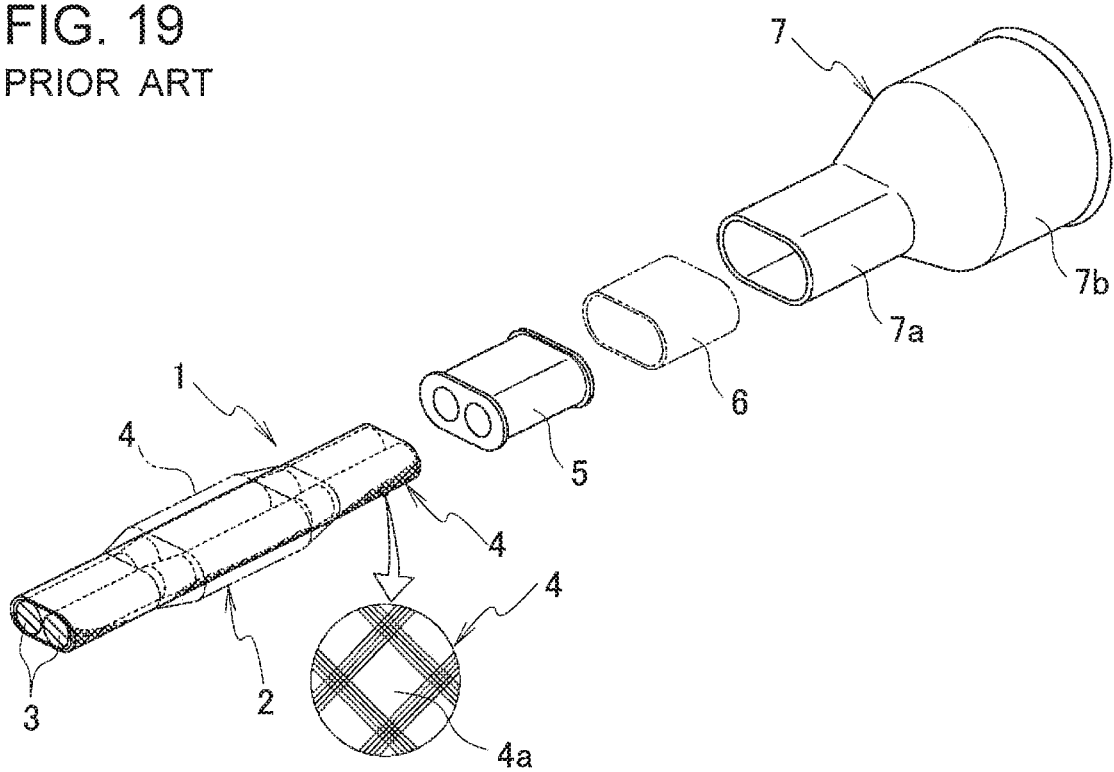
FIG. 19 is an exploded perspective view of a conventional waterproofing structure for a shielded cable.
Figure 20:
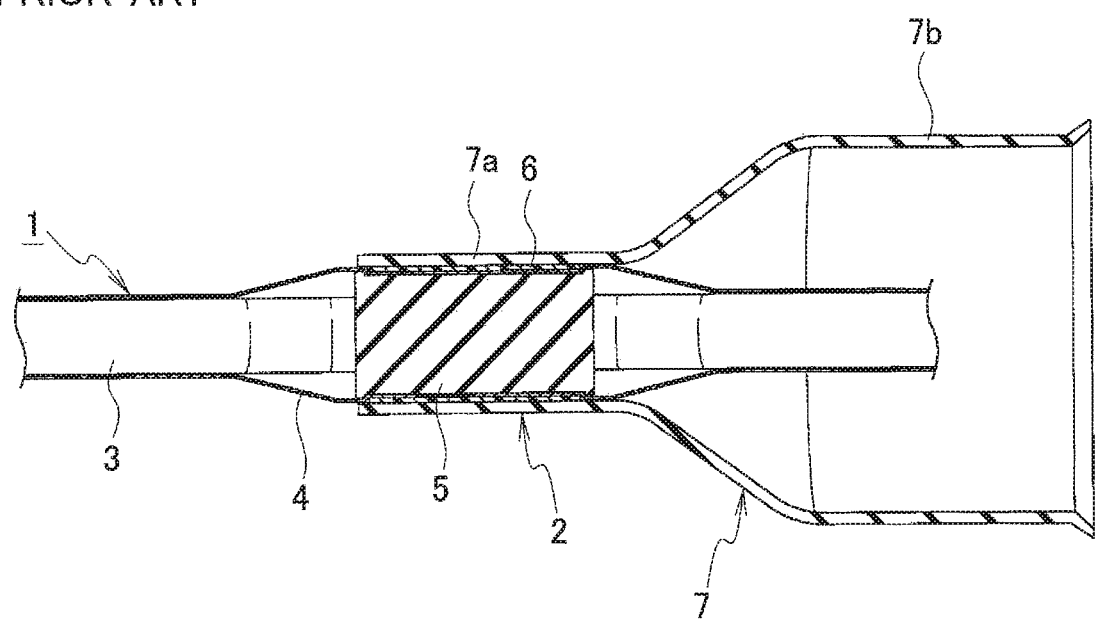
FIG. 20 is a cross-sectional view of the conventional waterproofing structure for the shielded cable.

With reference to FIGS. 16 to 18, a waterproofing structure for a shielded cable according to a sixth embodiment will be described.

As illustrated in FIGS. 16 and 17, in the sixth embodiment, a shielded cable 10' includes two coated cables 12 and a conductive and tubular braided wire 13 as a shielding member for collectively covering the two coated cables 12, and has a sheathless structure in which the outside of the braided wire 13 is not covered with an insulating sheath. The shielded cable 10' is used, for example, as a harness for high voltage for power feeding, wiring, and the like of various vehicles such as an HEV and an EV. In the fifth embodiment, the coated cable 12 is used, whereas in the sixth embodiment, the two coated cables 12 are used, which is a big difference.

The waterproofing structure 11 for the shielded cable 10' according to the sixth embodiment includes a shielded cable 10' having a part (e.g. a portion where there is a risk of infiltration based on past infiltration cases) that is subjected to waterproofing treatment and a rubber grommet 20 as a waterproofing member for covering a waterproofed portion of the braided wire 13 of the shielded cable 10'.

More specifically, as illustrated in FIGS. 16 and 17, each of the coated cables 12 includes a core wire 12a at the center and an insulating coating 12b that is formed of an insulator such as an insulating resin and covers the outer periphery of the core wire 12a. On the outer side of the waterproofed portion (a portion facing a small-diameter cylindrical portion 22 of the grommet 20) of the braided wire 13 for collectively covering the two coated cables 12, a heat shrinkable tube 18 including pasty adhesive 19 applied to the inner circumferential surface as a waterproofing filler is disposed to surround the waterproofed portion of the braided wire 13.

Then, as illustrated in FIGS. 16 to 18, the adhesive 19 pushed into the braided wire 13 by the heat shrinkable tube 18 that is heat-shrunk by being heated to a predetermined temperature reliably permeates and fills the gaps 13b between the plurality of strands 13a of the braided wire 13 and the gaps between the two coated cables 12, and each of the gaps described-above is blocked.

The grommet 20 includes the small-diameter cylindrical portion 22 having an elliptic cylindrical shape, a large-diameter cylindrical portion 23 having a cylindrical shape, and an intermediate portion 24 having a conical cylindrical shape and connecting the small-diameter cylindrical portion 22 and the large-diameter cylindrical portion 23. A space between the outer circumferential surface of the heat-shrunk heat shrinkable tube 18 and the inner circumferential surface of the small-diameter cylindrical portion 22 is blocked without any gap by a lip portion (not illustrated) that is formed integrally the inner circumferential surface of with the small-diameter cylindrical portion 22 to project from the inner circumferential surface of the small-diameter cylindrical portion 22. Then, the waterproofing structure 11 for the shielded cable 10' according to the sixth embodiment prevents infiltration of water from the outside of the vehicle compartment on the side of the small-diameter cylindrical portion 22 of the grommet 20 to the inside of the vehicle compartment on the side of the large-diameter cylindrical portion 23 of the grommet 20.

In the waterproofing structure 11 for the shielded cable 10' according to the sixth embodiment, when the waterproofed portion of the shielded cable 10' including the two coated cables 12 and the tubular braided wire 13 as a shielding member for covering the two coated cables 12 is covered with the small-diameter cylindrical portion 22, first, the heat shrinkable tube 18 including the pasty adhesive 19 applied to the inner circumferential surface is disposed on the outer side of the braided wire 13 in the waterproofed portion of the shielded cable 10' by inserting the braided wire 13. Next, the heat shrinkable tube 18 is heated and heat-shrunk to push the adhesive 19 applied to the inner circumferential surface of the heat shrinkable tube 18 into the gaps 13b between the plurality of strands 13a of the braided wire 13 and the gaps between the two coated cables 12 to reliably fill the gaps, and the inner circumferential surface of the small-diameter cylindrical portion 22 is pressed against the outer circumferential surface of the heat shrinkable tube 18 heat-shrunk by the elastic force of the small-diameter cylindrical portion 22 to achieve sealing, whereby the waterproofing structure 11 for the shielded cable 10' is manufactured. This can easily and reliably prevent infiltration of water from the outside of the vehicle compartment on the side of the small-diameter cylindrical portion 22 of the grommet 20 to the inside of the vehicle compartment on the side of the large-diameter cylindrical portion 23 of the grommet 20.

The waterproofing structure 11 for the shielded cable 10' according to the sixth embodiment only has to push the adhesive 19 by heat shrinkage of the heat shrinkable tube 18 into and fill the gaps 13b between the plurality of strands 13a of the braided wire 13 in the entire region of the waterproofed portion and the gaps between the two coated cables 12, without using a part such as a rubber waterproofing plug as used in the conventional example. Therefore, the waterproofing structure 11 for the shielded cable 10' according to the sixth embodiment enables to reduce the number of parts and man-hours to reduce cost, and to make the whole structure more compact and lighter.

In addition, when the shielded cable 10 having the waterproofing structure 11 according to the fifth embodiment and the shielded cable 10' having the waterproofing structure 11 according to the sixth embodiment are bundled and used as a wire harness for power feeding, wiring, and the like of various vehicles such as an HEV and an EV, it is possible to reduce a space for wiring to the vehicle to save space.

In the waterproofing structure 11 of the shielded cable 10' according to the sixth embodiment, the two coated cables 12 are shielded by covering them collectively with the braided wire 13, but the number of the coated cables 12 shielded with the braided wire 13 is not limited to two, and may be three or more.

In addition, in the first to sixth embodiments, the rubber grommet 20 is used as the waterproofing member, but the waterproofing member is not limited to the rubber grommet.

What is claimed is:

1. A shielded-cable waterproofing structure, comprising:
a shielded cable including one or more cables and a braided wire serving as a shielding member and covering the cables; and
a waterproofing member covering a waterproofed portion of the braided wire, wherein
a waterproofing filler is disposed on at least one of an inner side and an outer side of the waterproofed portion of the braided wire, and
at least gaps between a plurality of strands of the braided wire out of the gaps between the plurality of strands of the braided wire and a gap between closest portions of the braided wire and the waterproofing member are filled with the waterproofing filler along, in a longitudinal direction of the waterproofing member, an entire length of a cylindrical portion of the waterproofing member that is in direct contact with the filler from an opening at one longitudinal end of the cylindrical portion to an opposite longitudinal end of the cylindrical portion at which the cylindrical portion is directly connected to a conical portion of the waterproofing member that is increased in diameter as a distance from the cylindrical portion is increased in the longitudinal direction.

2. The shielded-cable waterproofing structure according to claim 1, wherein
the braided wire collectively covers the cables, and
a gap between the cables is filled with the waterproofing filler.

3. The shielded-cable waterproofing structure according to claim 1, wherein
the shielded cable has a sheathless structure where an outside of the braided wire is not covered with an insulating sheath.

4. The shielded-cable waterproofing structure according to claim 1, wherein
the waterproofing filler is a thermoplastic resin, and
the gaps are blocked by the thermoplastic resin melted by heating and pressurization generated by tightening by the waterproofing member.

5. The shielded-cable waterproofing structure according to claim 1, wherein
the waterproofing filler is a swelling agent to be swelled by water absorption, and
the gaps are blocked by the swelling agent swelled by water absorption and pressurization generated by tightening by the waterproofing member.

6. The shielded-cable waterproofing structure according to claim 1, wherein
the waterproofing filler is an adhesive applied to an inner circumferential surface of a heat shrinkable tube to be heat-shrunk by heating, and
the gaps are blocked by pressing the adhesive of the heat shrinkable tube that is heat-shrunk by heating.

7. A shielded-cable waterproofing method, comprising:
when covering a waterproofed portion of a shielded cable including one or more cables and a braided wire serving as a shielding member and covering the cables, with a waterproofing member;
disposing a waterproofing filler on at least one of an inside and an outside of the braided wire in the waterproofed portion on the shielded cable;
filling at least gaps between a plurality of strands of the braided wire out of the gaps between the plurality of strands of the braided wire and a gap between closest portions of the braided wire and the waterproofing member with the waterproofing filler along, in a longitudinal direction of the waterproofing member, an entire length of a cylindrical portion of the waterproofing member that is in direct contact with the filler from an opening at one longitudinal end of the cylindrical portion to an opposite longitudinal end of the cylindrical portion at which the cylindrical portion is directly connected to a conical portion of the waterproofing member that is increased in diameter as a distance from the cylindrical portion is increased in the longitudinal direction; and pressurizing the waterproofed portion filled with the waterproofing filler by tightening by the waterproofing member such that a gap is not generated.

8. The shielded-cable waterproofing structure according to claim 1, wherein the waterproofing filler is also disposed between closest portions of the braided wire and the one or more cables along, in the longitudinal direction of the waterproofing member, the entire length of the waterproofing member.

\* \* \* \* \*